July 25, 1967 A. G. UPDIKE 3,333,109

MEANS FOR CONVERTING AN INPUT SIGNAL TO A REPRESENTATIVE VOLTAGE

Filed Nov. 22, 1963 4 Sheets-Sheet 1

ABNER G. UPDIKE
INVENTOR.

BY Stuart Lubitz
ATTORNEY

ABNER G. UPDIKE
INVENTOR.

BY Stuart Lubitz
ATTORNEY

ABNER G. UPDIKE
INVENTOR.

BY Stuart Lubitz
ATTORNEY

July 25, 1967 A. G. UPDIKE 3,333,109

MEANS FOR CONVERTING AN INPUT SIGNAL TO A REPRESENTATIVE VOLTAGE

Filed Nov. 22, 1963 4 Sheets-Sheet 4

ABNER G. UPDIKE
INVENTOR.

BY Stuart Lubitz
ATTORNEY 3,333,109

MEANS FOR CONVERTING AN INPUT SIGNAL TO A REPRESENTATIVE VOLTAGE

Abner G. Updike, Menlo Park, Calif., assignor to Ampex Corporation, Redwood City, Calif., a corporation of California Filed Nov. 22, 1963, Ser. No. 325,706
8 Claims. (Cl. 307—88.5)

ABSTRACT OF THE DISCLOSURE

Electronic apparatus for converting an input signal to a representative output voltage by generating a varying voltage with a function generator, and then sampling the varying voltage by means of a gated circuit which in turn transmits to a storage device a current proportional to the voltage at the instant of sampling.

Generally there are two principle types of demodulating circuits which convert a frequency modulated signal into a proportional voltage. A first type of demodulating circuit generally employs a reactive element whose impedance changes as a function of the frequency supplied to the demodulating circuit. A voltage change may then be derived from the reactive element which constitutes a function of the frequency change of the input signal. This type of demodulating circuit has the problems of phase shift and relatively poor linearity of voltage change to frequency change. It is very difficult in such systems to maintain the necessary degree of linearity over wide frequency bands.

A second type of frequency demodulator operates on what is known as a digital theory and may be made more linear over wide frequency variations. In this latter type of circuit, the input frequency signal is converted into a series of volt second area pulses. An indicating circuit is then employed to sum the number of pulses for a given time to provide an output voltage level which constitutes a function of the frequency of the input signal. The major problem in this type of demodulating circuit is the provision of constant volt second area pulses. Such phenomenon as drift, temperature change and the like result in the value of the volt second area pulses changing and thus result in an erroneous output signal. It has also been difficult to achieve pulses with sufficiently short fall or cut-off times. There have been many attempts to overcome the difficulties such as evidenced by U.S. Patent 3,099,800, issued on July 30, 1963, to B. H. Vinson et al. These attempts have overcome some of the above described difficulties, but when used in a communication system that utilizes selectable carrier frequencies (typically ranging from 3⅜ kc. to 108 kc. and deviated by a plus or minus 40% of the carrier frequency) it is necessary to have an excessive amount of filtering in order to transmit the significant part of the pulse information. This filtering is necessitated by the fact that the pulse type systems in order to obtain the desired accuracy may require pulses with an amplitude as high as 12 volts.

It is a general object of this invention to provide a circuit means that converts an input signal into a representative voltage;

Another object of this invention is to provide a circuit means for converting a frequency modulated input signal into a representative output voltage;

Another object of this invention is to provide a demodulator circuit means which converts a modulated carrier wave to a voltage representative of the modulating signal;

Another object of this invention is to overcome the above-mentioned shortcomings of the prior art devices;

Another object of this invention is to provide an improved demodulator circuit means that requires a minimum of filtering;

Another object of this invention is to provide a demodulator circuit means for a recording system;

Another object of this invention is to provide a demodulator circuit means that may be utilized with carrier frequencies ranging from 3⅜ kc. to 108 kc. without the necessity of a multiplicity of filtering capacitors;

Another object of this invention is to provide a demodulator circuit means that may be utilized with a recording system wherein the medium may be moved at a plurality of speeds;

Another object of this invention is to provide a demodulator circuit means that has excellent linearity.

These and other objects will be readily understood when the specification is read in conjunction with the drawings, wherein.

In order to accomplish the above objects, a new approach to demodulating or converting a frequency modulated wave has been invented. The invented system or approach utilizes a function generator that generates an output signal adapted to translate a varying frequency input signal into a representative voltage. In the described embodiment a hyperbolic or exponential function is generated, that is, a voltage is generated which varies with time according to a hyperbolic or exponential function. It is, of course, within the broad scope of the invention to utilize other types of functional generator to demodulate other than varying frequency inputs. The varying voltage that is generated by the function generator means is sampled by a gated means that transmits a current to a storage means proportional to the voltage at the instant of sampling. At approximately the same instant that the voltage of the function generator means is sampled, or a short time thereafter, the function generator means is reset and begins again to generate another output signal or voltage. The sampling and resetting occurs at a rate proportional to the frequency of the input signal or modulated carrier. Since the sampling takes place at a rate proportional to the modulated carrier and since the voltage generated by the function generator is continually varying according to the prescribed function, it can be seen that the voltage applied to a gated amplifier means is proportional to the frequency of the modulated carrier signal. Consequently, the current pulse transmitted by the gated means to the storage means will be proportional to the frequency of the modulated carrier. The cooperation of the function generator, the gated means and the storage means in relation to an input signal is an important aspect of this invention.

Figure 1:
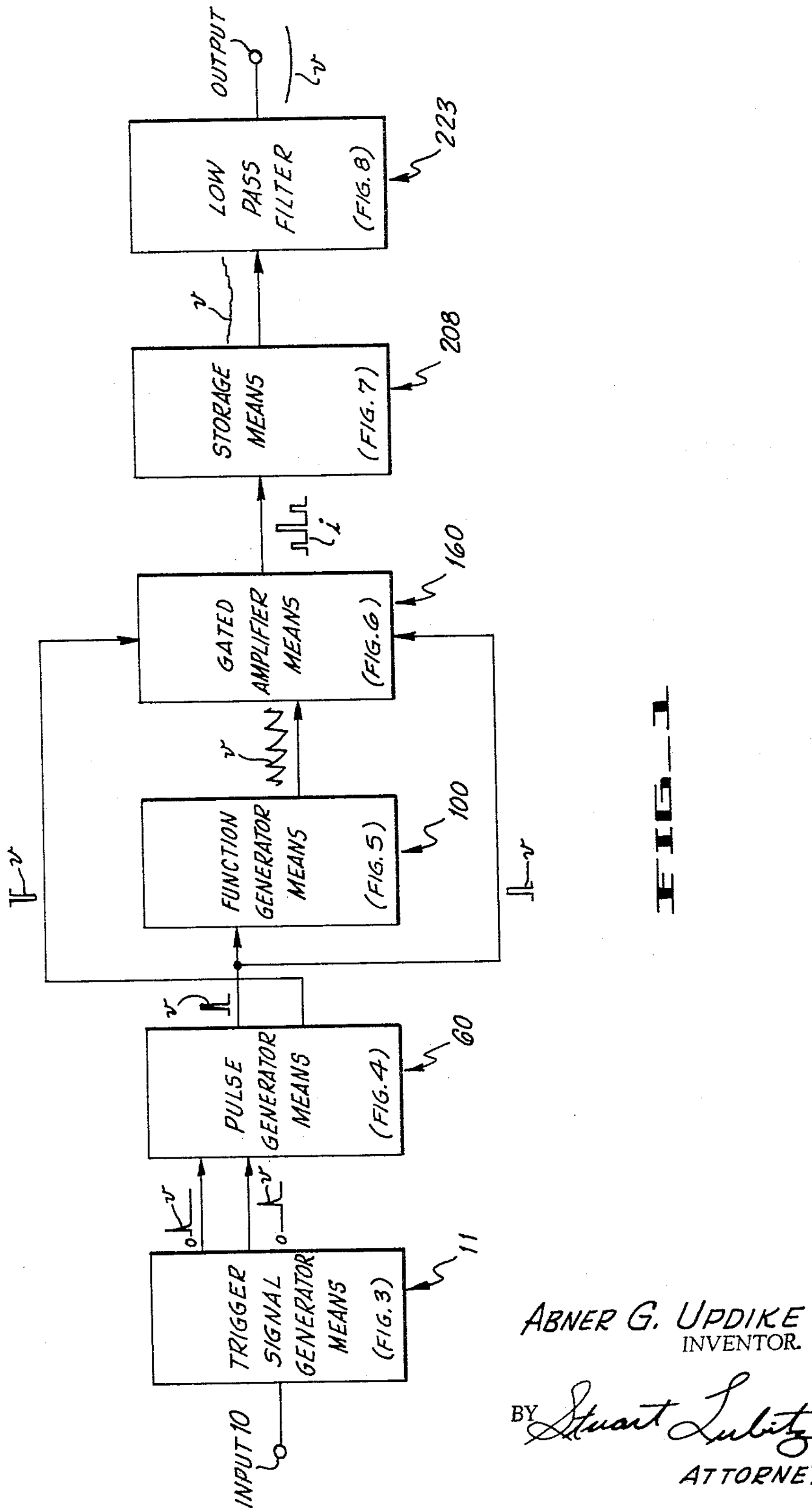
FIGURE 1 is a functional diagram of the demodulator circuit means or assembly.

Referring to FIGURE 1, the demodulating system or means is shown in a functional box arrangement. Some of the specific circuits utilized in the functional arrangement are well known and it should be kept in mind when the circuits shown in FIGURES 3–8 are described that it is within the scope of the invention to substitute other well known equivalent circuits. Considering FIGURE 1 the input to the demodulator circuits means when used in a video, instrumentation or other tape recording systems would be a limited frequency modulated signal. Generally speaking a limited frequency modulated signal is one which has the amplitude stabilized by a limiting circuit means or amplifier that is adapted to generate an output signal of a given amplitude. Such limiting circuits are well known in the art as described in such publications as Video Tape Recording by Julian L. Bernstein published by John F. Rider, Publisher, New York on July 1960, pages 51 and 212–217.

Figure 2:
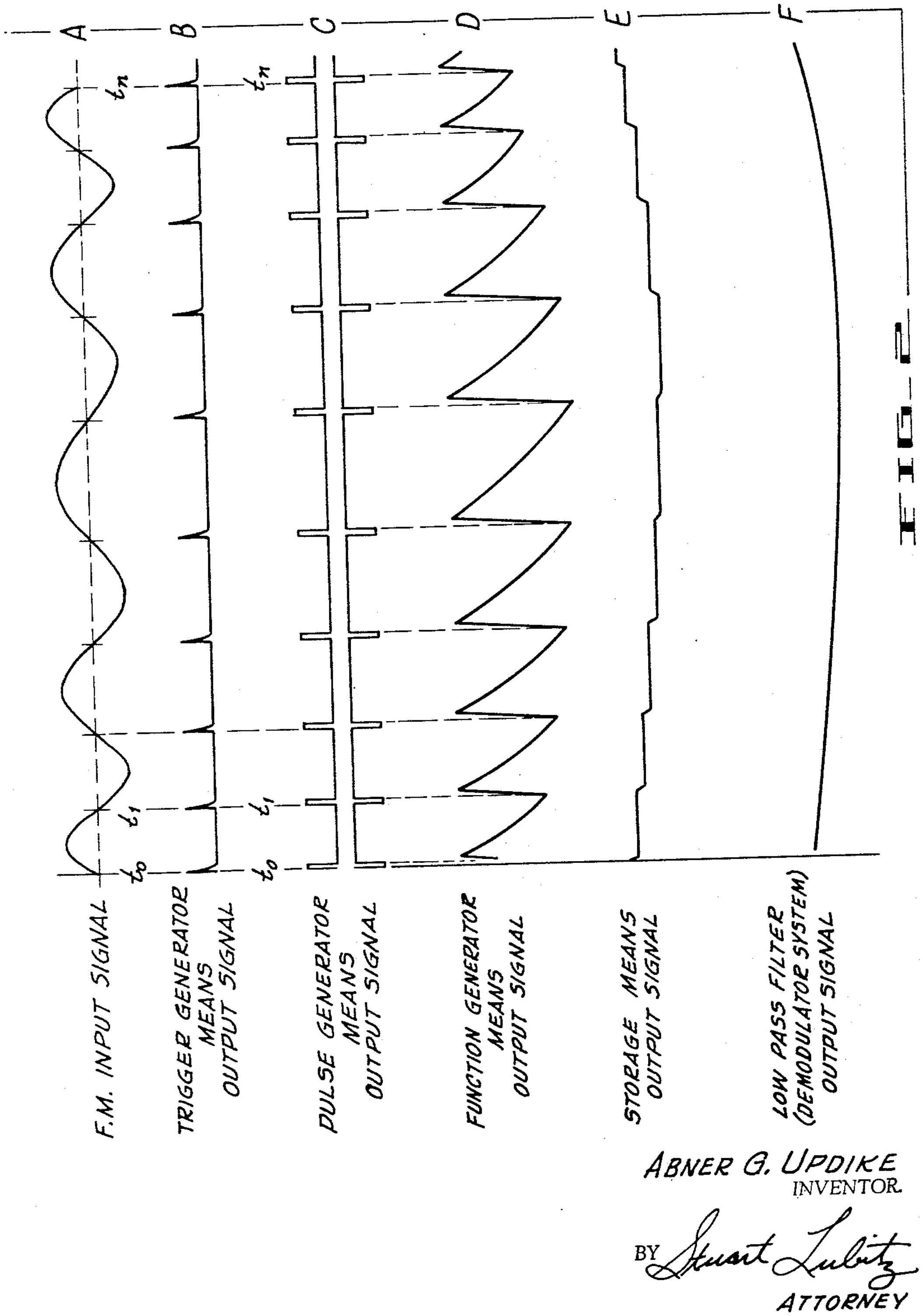
FIGURE 2 is a graphical representation of the output signals from a number of the sub-systems of the demodulator circuit means.

The limited frequency modulated signal is supplied to input termial 10 (FIGURES 1 and 2) which in turn is connected to the trigger signal generator means 11 for generating a plurality of short rise and fall time pulses or spike like pulses at a rate determined by the frequency of the limited frequency modulated input signal. The trigger signal generator means 11 may take on many different constructions and may be designed to sense any of a number of different portions of the frequency modulated wave in order to generate trigger signals whose spacing is proportional to the frequency of the modulated input. This trigger signal generator means 11 may be designated to generate positive or negative trigger pulses or both positive and negative trigger pulses simultaneously. In an embodiment of the invention shown in FIGURE 3 the trigger signal generator means takes the form of a conventional Schmidt Trigger circuit that generates positive and negative trigger pulses at the same instant. The outputs from the trigger signal generator means 11 and the approximate time relationship to the other outputs of the subsystem of the demodulator means is generally shown in FIGURE 1 and FIGURE 2, graph B.

Figures 3, 4, 5:
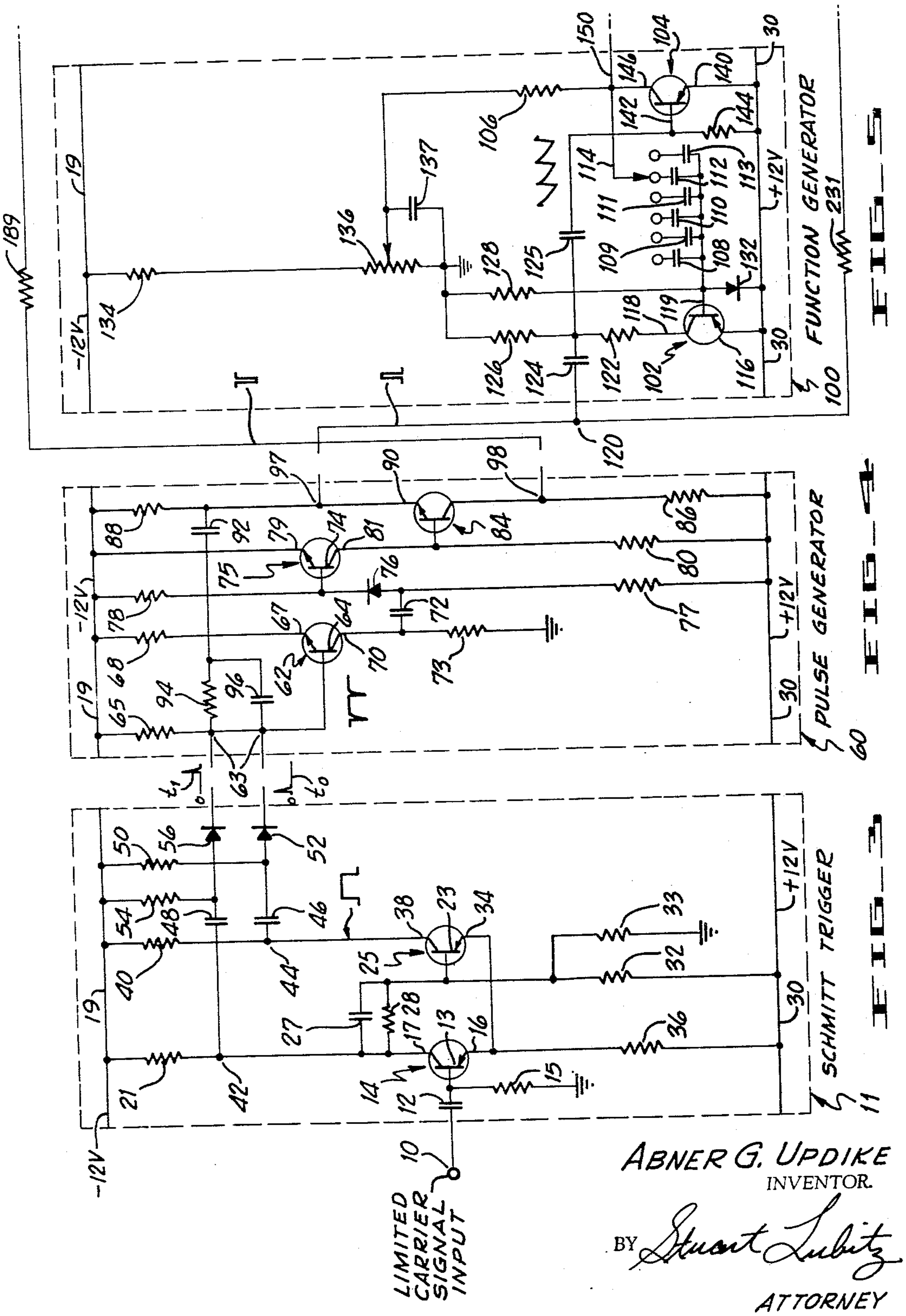
FIGURE 3 is an electrical schematic diagram of a trigger signal generator means that may be used in the demodulator circuit means of FIGURE 1.
FIGURE 4 is an electrical schematic diagram of a pulse generator means that may be used in the demodulator circuit means of FIGURE 1.
FIGURE 5 is an electrical schematic diagram of a novel function generator means used in the demodulator circuit means of FIGURE 1.

Referring more specifically to FIGURE 3 the Schmidt Trigger circuit is shown in detail. This type of circuit is well known in the art and is considered in detail in such publications as a "Handbook of Selected Semi-Conductor Circuits" prepared by Transistor Applications Inc. for Bureau of Ships, Department of the Navy and published in 1960, pages 6–63 to 6–65 and "Basic Theory and Applications of Transistors," Department of the Army, March 1959, pages 208–210. The Schmidt Trigger circuit is commonly used as a zero crossing detector with excellent sensitivity and stability. This circuit has the characteristic feature of including two transistors with the collector of one transistor being connected to the base of the other transistor. The Schmidt Trigger circuit also utilizes a common emitter resistor. This circuit arrangement provides regenerative feedback to obtain a fast switching time.

The Schmidt Trigger circuit shown in FIGURE 3 comprises a coupling capacitor 12 connected to the base 13 of the transistor 14. The base 13 is also connected to a bias resistor 15 which is connected to ground. The collector 17 of the transistor 14 is connected to a negative voltage supply (not shown) via the negative bus or terminal 19 and the collector resistor 21. A voltage of −12 volts DC may be typically supplied to the negative bus 19. The collector 17 is also coupled to the base 23 of a second transistor 25. This coupling of the collector 17 to the base 23 is accomplished via a commutative capacitor 27 and a resistor 28. It should be noted that the resistor 28 in effect connects the negative bus 19 to the base 23 via resistor 21. The base 23 is connected to a positive bus or terminal 30 via a biasing resistor 32 and is connected to ground by a resistor 33. The resistor 33 has a low resistance value, such as 300 ohms, that functions to prevent the transistors 14 and 25 from saturating. This enables the trigger signal generator to operate at a relatively high frequency such as 700 kc. The positive bus or terminal 30 is connected to a positive voltage source (not shown) which may take the form of a +12 volt DC supply. The emitter 34 of the transistor 25 is connected to the emitter 16 of the transistor 14 and both of these emitters are connected to the positive bus 30 via the common emitter resistor 36. The transistor 25 has a collector 38 that is connected to the negative bus 19 via a collector resistor 40.

The collector 17 of the transistor 14 and the collector 38 of the transistor 25 are connected to pulse shaping circuits that are attached to the terminals 42 and 44. These pulse shaping circuits comprise capacitors 46 and 48 that are coupled to resistor 50 and diode 52 and resistor 54 and diode 56 respectively. The RC portion of the pulse shaping circuits 46, 48, 50 and 54 are proportioned to form a spike output signal from the relatively square output signal of the transistor 14 and 25. This forming of the spike or trigger pulse is accomplished by making the time constant of the RC circuit very small in comparison to the pulse width of the square output pulses supplied by the transistors 14 and 25. The diodes 52 and 56 are commonly referred to as steering diodes and in this circuit they function to pass only positive spike signals.

The above-described circuit may be constructed from the following components:

| Elements: | | Values of the elements |
|---|---|---|
| Capacitor **12** | farad | 1 |
| Transistor **14** | | 2N711 |
| Resistor **15** | ohms | 1K |
| Resistor **21** | do | 2.2K |
| Transistor **25** | | 2N711 |
| Capacitor **27** | pf | 30 |
| Resistor **28** | ohms | 4.7K |
| Resistor **32** | do | 10K |
| Resistor **33** | do | 330 |
| Resistor **36** | do | 3.3K |
| Resistor **40** | do | 1.5K |
| Capacitor **46** | pf | 30 |
| Capacitor **48** | pf | 30 |
| Resistor **50** | ohms | 2.2K |
| Resistor **51** | do | 2.2K |
| Diode **52** | | 1N96 |
| Diode **56** | | 1N96 |

In operation the transistor 14 is maintained in a relatively cut off condition by the reverse bias developed by the flow of current through the emitter 34 of transistor 25 and the resistor 36. The negative bias applied to the emitter 16 may be overcome by applying a negative signal of sufficient amplitude to the base 13. The negative signal may be a portion of the frequency modulated input signal. When this negative signal occurs the potential of the collector 17 becomes less negative. The potential change at the collector 17 is coupled to the base 23 of the transistor 25 decreasing the emitter current of the transistor 34 and lowering the potential drop across the resistor 36. This raises the potential of the emitter 16 and increases the current at the collector 17 and results in a regenerative action that facilitates rapid switching of the transistors 14 and 25. The output signal at the terminal 42 at this point is a more positive voltage generally in the form of a relatively square output signal. This condition will continue until the input begins to rise and the positive going input places a reverse bias on the transistor 14 causing the collector voltage at collector 17 to become more negative. The change in collector voltage will begin to forward bias the transistor 25 altering the emitter current at the emitter 16 and altering the potential drop across resistor 36. The alteration of the potential drop across the resistor 36 and the decrease of the voltage at the base 23 serves to forward bias the transistor 25 and place it in a state of relatively high conduction, while the transistor 14 is substantially cut off.

The output generated by the transistors 14 and 25 at the terminals 42 and 44, respectively, will in general take the form of a square wave. These square waves at the terminal 42 and 44 are then transmitted to the pulse shaping circuits formed by capacitors 46 and 48 and resistors 50 and 54 where the pulses are formed into spike type signals. It is significant that these spike signals occur at a rate or spacing proportional to the frequency of the modulated input signal, that is, the trigger signal generator means will sense when the input signal becomes negative and at that time generate a spike signal. From this it can be seen that the spike signals will be proportional to the frequency of the modulated input signal. It should be understood that a spike signal may be generated for every half cycle or for a whole cycle or multiple thereof.

In regards to the diodes 52 and 56 these are commonly known as steering diodes and they pass positive spike signals. It should be noted that when the transistor 14 is becoming nonconductive, the collector 38 of the transistor 25 is going positive. It is this positive signal that is transmitted through the diode 52. The negative output signal of the transistor 14 is stopped by the diode and dissipated in the resistor 54. When the transistor 14 is becoming conductive its collector voltage 17 is becoming more positive and the collector voltage of the collector 38 is becoming more negative. The positive voltage at the collector 17 is transmitted through the diode 56 as a spike signal. The positive pulses generated from collectors 17 and 38 are combined in the pulse generator means 60 to form a continuous waveform. The combined output signals of the trigger signal generator are shown in graph B of FIGURE 2.

As shown in FIGURE 1 the spike pulses generated by the trigger signal generator means 11 are supplied to the pulse generator means 60. It is the function of the pulse generator means 60 to generate signals proportional to the frequency of the modulated input signal having a very narrow well-defined width and having an amplitude of a selected level. The pulse width generated by the pulse generator means may be in the neighborhood of 150 nanoseconds. These pulses are supplied to both the function generator means 100 and a gated means or gated amplifier means 160 to, in part, control their operation. A positive and negative control pulse is simultaneously supplied to the gated means 160 while only a positive pulse is supplied to the function generator means 100. The rate of generation of these pulses is controlled by the rate at which the spike pulses of the trigger signal generator means 11 are supplied to the pulse generator means 60. The control pulses from the pulse generator means 60 are therefore generated at a rate proportional to the frequency of the frequency modulated input signal.

A typical embodiment of the pulse generator means 60 is shown in detail in FIGURE 4. This pulse generator means 60 may be alternatively termed a modified one-shot multivibrator circuit. There are, of course, many other different circuit configurations that may be used to perform the function of the pulse generator means 60.

The pulse generator means 60 shown in FIGURE 4 comprises a transistor 62 having its base 64 connected directly to the input terminals 63. These terminals 63 are connected to the steering diodes 52 and 56 and the negative bus 19 via a resistor 65. The transistor 62 has an emitter 67 which is connected to an emitter or bias resistor 68 which is in turn connected to the negative bus 19. The collector 70 of the transistor 62 is connected to a resistor 73 that is connected to ground and to a capacitor 72. The capacitor 72 is connected to a resistor 77 which is connected to the plus voltage bus 30. These connections result in the transistor 62, as in conventional one-shot or monostable multivibrators, assuming a normally off condition or nonconductive condition.

The capacitor 72 is connected to the base 74 of a transistor 75 via a safety or voltage limiting diode 76. The diode 76 functions to limit the voltage applied to the transistor 75 and thereby prevents damaging the transistor 75. The base 74 is also connected to the negative bus 19 via a resistor 78. The transistor 75 has its emitter 79 connected to the negative bus 19 while its collector 81 is connected to the positive bus 30 via the resistor 80. These connections apply a relatively positive voltage to the collector 81, a negative voltage to the base 74 and a more negative voltage to the emitter 79 which is directly connected to the negative bus 19. This biasing of the transistor 75 maintains it in an on condition.

The collector 81 is connected to an output or switching transistor 84. The transistor 84 which is biased to normally be nonconductive is connected to the positive bus 30 via a resistor 86 and is connected to the negative bus 19 via a resistor 88. The resistors 80, 86 and 88 bias the transistor 84 so that it is in a normally nonconductive condition. The emitter 90 of the transistor 84 is connected in a feedback relationship to the base of transistor 62 via a capacitor 92 and a speedup or pulse shaping network formed by the resistor 94 and the capacitor 96 connected to the capacitor 92. The resistor 94 and the capacitor 96 functions to provide a spike-like feedback pulse to the base 64 of the transistor 62. This spike-like pulse serves to sharply turn the transistor 62 off. It should be noted in this respect the one-shot multivibrator differs from the conventional one-shot multivibrator, that is the transistor 62 is turned off by the transistor 84 rather than by the discharge of the capacitor 72.

The resistors 86 and 88 connected to transistor 84 are equal in value and result in a plurality of substantially identical pulses at the terminals 97 and 98. More particularly one of the pulses is positive, one of the pulses is negative, and both of them are of substantially equal amplitude. These pulses take the form of a relatively square shaped pulse having very narrow pulse widths that are well defined.

The circuit described above may be constructed from the following components:

| Elements: | | Values of the elements |
|---|---|---|
| Transistor 62 | | 2N706 |
| Resistor 65 | ohms | 2.2K |
| Resistor 68 | do | 1.5K |
| Capacitor 72 | pf | 20 |
| Resistor 73 | ohm | 1K |
| Transistor 75 | | 2N706 |
| Resistor 77 | ohms | 47K |
| Resistor 78 | do | 2.2K |
| Resistor 80 | do | 6.8K |
| Resistor 86 | do | 510 |
| Resistor 88 | do | 510 |
| Capacitor 92 | farad | .1 |
| Resistor 94 | ohms | 22K |
| Capacitor 96 | pf | 10 |

In operation, the pulse generator means 60 receives positive spike like pulses from the trigger signal generator means 11. The spike pulses are combined to provide a continuous series of pulses corresponding to the zero crossover points of the input FM. The positive pulses are applied to the base 64 of transistor 62 turning this transistor on. This in turn causes the capacitor 72 to turn the transistor 75 off. The switching of the transistor 75 results in a potential at the collector 81 which turns the transistor 84 on. The turning on of the transistor 84 results in a negative signal being applied to the terminal 98 and a positive signal being applied to the terminal 97. When the transistor 62 reaches saturation, capacitor 72 is able to start discharging through resistor 77, eventually reaching a state where transistor 75 starts to conduct again. When transistor 75 starts to conduct the change in potential at the collector 81 causes the transistor 84 to be turned off. The turning off of the transistor 84 terminates the negative signal applied to the terminal 98 and the positive signal applied to the terminal 97. A feedback pulse is supplied to the transistor 62 from the terminal 97 in the form of a spike signal formed by the resistor 94 and the capacitor 96. This spike signal turns the transistor 62 off.

The positive pulse at the terminal 97 is transmitted to the function generator means 100 and the gated amplifier means or bilateral charging circuit 160. The negative pulse developed at terminal 98 is transmitted to the gated amplifier means 160. These precisely formed square shaped pulses that are generated at a rate proportional to the frequency of the modulated input signal are utilized to control the function generator means 100 and the gated amplifier means 160. The pulses transmitted to the gated amplifier means 160 trigger it to generate a current burst or pulse that is proportional to the voltage applied to the gated amplifier means 160 by the function generator means 100 at the instant the pulses are transmitted from the pulse generator means 60. The negative going portion of the positive pulse supplied to the terminal 97 is utilized to reset the function generator means 100 which then begins to generate a hyperbolic, exponential or other function anew.

The function generator means 100 is constructed to generate a voltage that is adapted to translate an input signal into a representative voltage. The most desirable form of this voltage for the demodulation of a frequency modulated signal is a hyperbolic voltage. A hyperbolic function is desirable because the frequency-time relationship by which the intelligence is transmitted is a hyperbolic function. This type of voltage is difficult to generate. In the disclosed embodiment, an exponential voltage is utilized. This voltage very closely approximates the desired hyperbolic voltage in the range of circuit operation. It should be understood that it is within the broad scope of the invention to utilize other function generators to accomplish demodulation of other types of signals or to perform various mathematical operations.

The function generator means 100 (FIGURE 5) broadly comprises a pair of solid state elements or transistors 102 and 104 and an RC network including the resistor 106 and the capacitors 108 to 113. The capacitors 108 to 113 are connected to the resistor 106 by a movable contact or switch 114. The bank of capacitors enable an RC circuit to be selected which is compatible with the particular tape speed utilized in the tape recorder system or more broadly it enables the demodulator circuit to be used with various carrier frequencies. Since a number of RC circuits are employed, a time constant is chosen which provides the optimum circuit linearity, and the various values of the resistor 106 and the capacitors 108–113 are chosen commensurate with the time constant.

The transistor 102 is normally on while the transistor 104 is normally off. The transistor 102 has its emitter 116 connected to the positive bus 30 while its collector 118 is connected to the input terminal 120 via the collector resistor 122 and a coupling capacitor 124. The collector 118 is also connected to ground via a resistor 126. The base 119 of the transistor 102 is connected to ground via a biasing resistor 128 and is connected to the positive bus 30 by a diode 132. These connections result in the transistor 102 being in a conductive or turned-on condition when a pulse is not delivered to the input terminal 120.

The transistor 104 which forms part of the discharge circuit has its emitter 140 connected to the positive bus 30 while its base 142 is connected to the positive bus 30 via a bias resistor 144. The base 142 is also connected to the input terminal 120 via the coupling capacitor 124 and a second coupling capacitor 125. The collector 146 of the transistor 104 is connected to the resistor 106 which in turn is connected to the negative bus 19 via resistor 136, filtering capacitor 137 and resistor 134. The transistor 104 is biased normally nonconductive or in an off condition so that the RC circuit may charge.

With the transistor 102 turned on, and the transistor 104 turned off, the capacitors 108 to 113 may be charged negatively via the limiting resistors 134, the potentiometer 136 and resistor 106. The charging circuit is completed to the positive bus 30 via the base 119 and the emitter 116. The resistor 106 and capacitor 112 substantially control the rate of charging of the RC circuit.

The function generator means 100 utilizes the negative going portion of the positive pulse supplied to its terminal 120 to turn the transistor 104 on. The negative going portion of the pulse is transmitted to the base 142 of the transistor 104 to forward bias it and cause it to become conductive. This forward biasing of the transistor 104 terminates the charging of the selected capacitor 108 to 113 and completes a discharge circuit comprising emitter 140, collector 146, switch arm 114, capacitor 112 (or any other selected capacitor) and diode 132. The diode 132 is selected so that a small forward bias will permit large current passage in a short period of time. It should be noted that the completion of the discharge circuit by the forward biasing of the transistor 104 causes the potential supplied to the base 119 of the transistor 102 and to the anode of the diode 132 to be more positive or greater than the 12 volts applied to the positive bus 30. This positive voltage turns off the transistor 102 and forward biases the diode 132 to enable the rapid discharge of the charged capacitor 112. As soon as the capacitor 112 is discharged to a given level, the current will return to its original condition and it will again begin to charge and develop its exponential or hyperbolic function. This function is applied to the output terminal 150.

The function generator means 100 may typically be constructed from the following components:

| Elements: | | Values of the elements |
|---|---|---|
| Transistor **102** | | 2N711 |
| Transistor **104** | | 2N711 |
| Capacitor **124** | picofarads | 30 |
| Resistor **122** | ohms | 2.2K |
| Capacitor **125** | microfarads | .003 |
| Resistor **126** | ohms | 2.2K |
| Resistor **128** | do | 18K |
| Diode **132** | | 1N3605 |
| Resistor **134** | ohms | 750 |
| Resistor **136** | do | 250 |
| Capacitol **137** | microfarads | 100 |
| Resistor **144** | ohms | 6.8K |

In summary a positive pulse is supplied from the pulse generator means 60 to the function generator 100. The negative going portion of the positive pulse turns on the transistor 104 which completes a discharge circuit for the RC circuit comprising resistor 106 and one of the selected capacitors 108 to 113. The completion of the discharge circuit also turns off the normally conducting transistor 102. With the discharge circuit completed, the selected and charged capacitor 108 to 113 rapidly discharges. Following this discharge the potential at the base 119 becomes such that the transistor 102 again becomes conductive and applies a potential via the resistor 122 and capacitor 125 to the base 142 which turns the transistor 104 off and permits the RC circuit to again assume the charging condition.

It should be noted that the function generator means might alternatively be regarded as a modified form of a one-shot multivibrator. It of course serves a function quite different than usually assigned to a one-shot monostable multivibrator. It functions to provide an exponential or hyperbolic output at the output terminal 150 which may be rapidly reset to its initial position. The output form at the terminal 150 is shown in FIGURE 2. It should be noted that the amplitude of the voltage applied to the output terminal 150 is proportional to the rate at which pulses are received from the pulse generator means 60 which in turn is proportional to the frequency of the frequency modulated input signal. This relationship is shown in FIGURE 2.

The output of the function generator means 100 is applied to what may be termed the gated amplifier means or a sample circuit means 160. The gated amplifier means 160 is also connected to both outputs of the pulse generator means 60. The output pulses from the pulse generator means 60 gate or trigger the gated amplifier means 160 to generate or discharge a current pulse. This current pulse is related to the output applied to the gated amplifier means 160 by the function generator means 100 at the instant the pulses from the pulse generator means 60 are applied to the gated amplifier means 160. Once the output of the function generator means 100 is sampled by the gated amplifier means 160 it is reset by the negative going portion of the positive pulse from the pulse generator means 60 and begins to apply a new output to the gated amplifier means 160.

Figures 6, 7, 8:
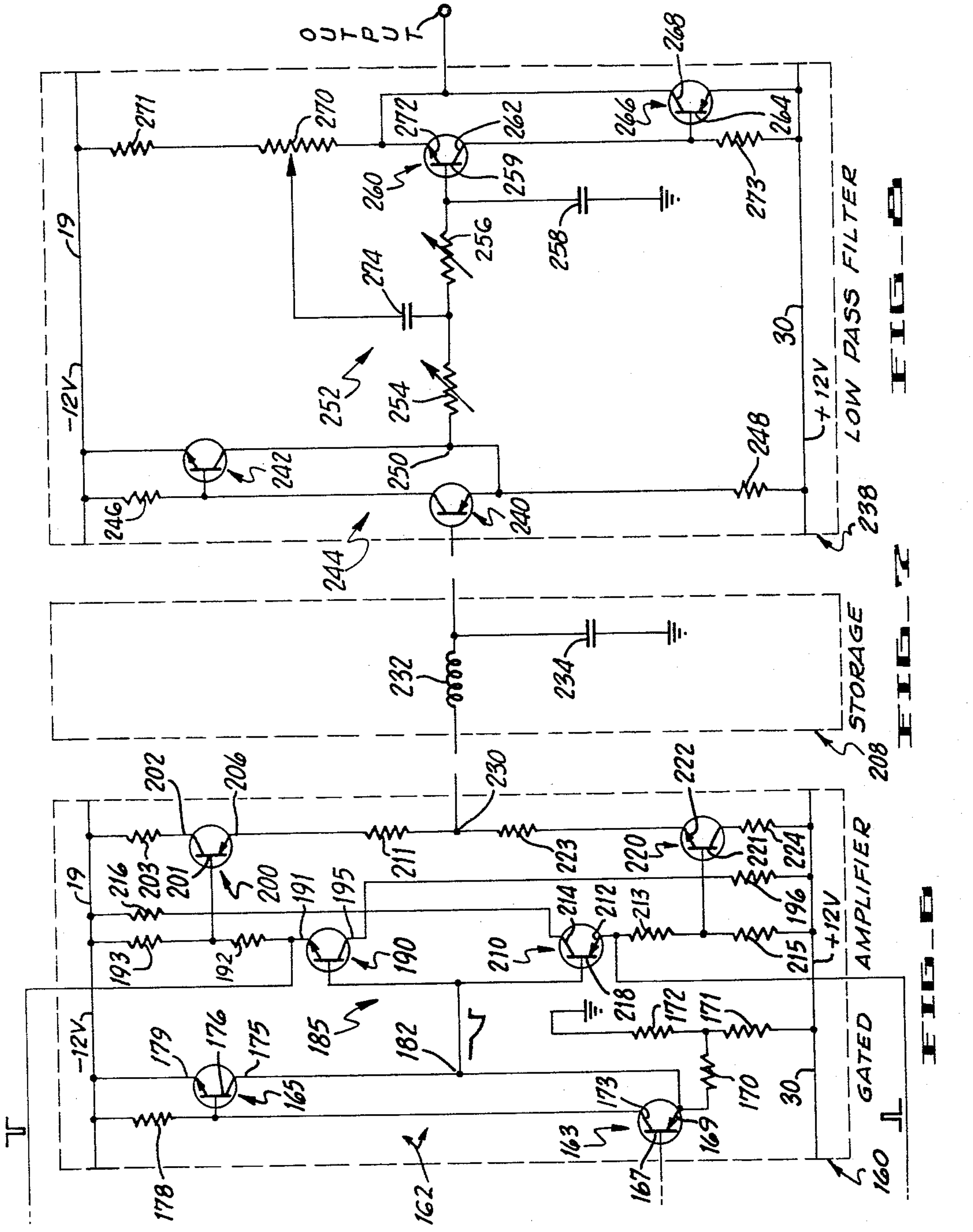
FIGURE 6 is an electrical schematic diagram of a gated amplifier means that may be used in the demodulator circuit means of FIGURE 1.
FIGURE 7 is an electrical schematical diagram of a storage means that may be used in the demoduator circuit means of FIGURE 1.
FIGURE 8 is an electrical schematic diagram of a low pass filter that may be used in the demodulator circuit means of FIGURE 1.

The gated amplifier means 160, as shown in FIGURE 6 comprises what may be broadly termed an emitter follower 162 that includes a pair of transistors 163 and 165. The transistor 163 has its base 167 connected to the output of the function generator means 100. The emitter 169 is connected to the positive bus 30 by a pair of resistors 170 and 171 and it is connected to ground via the resistors 170 and 172. The transistor 165 has its collector 175 connected to emitter 169 while its base 176 is connected to the collector 173 of the transistor 163. The base 176 is connected to the negative bus 19 via the bias resistor 178 while the emitter 179 is directly connected to the negative bus 19. Typically the emitter follower circuit may be constructed from the following elements.

| Elements: | | Values of the elements |
|---|---|---|
| Transistor **163** | | 2N863 |
| Transistor **165** | | 2N706 |
| Resistor **170** | ohms | 3K |
| Resistor **171** | do | 8.2K |
| Resistor **172** | do | 3.6K |
| Resistor **178** | do | 910 |

In operation the input signal applied from the function generator 100 to the base of the transistor 163 causes the transistor 163 to conduct which in turn applies a signal to the base 176 of the transistor 165. This signal results in the conduction of transistors 165 which develops an output signal as shown in the terminal 182. A portion of the output voltage is transmitted to the emitter 169 and functions as a negative feedback for improving temperature stabilization and linearity.

It should be noted that only part of the signal applied to the base 167 is passed on by the emitter 169 to the terminal 182. The total voltage swing applied to the base 167 may be as great as 14 volts while the terminal 182 and the attached circuit can tolerate only about plus or minus 2 volts. Consistent with this, the waveform developed at terminal 182 is a truncated version of the waveform at the terminal 150. This truncation is accomplished by having emitter 169 returned to the junction of resistors 171 and 172 so that the transistor 163 is biased off any time the voltage at the base 167 is more positive than emitter 169 which equals the voltage at the junction of resistors 171 and 172 at the time. This arrangement controls the maximum positive swing of the terminal 182. The maximum negative of the terminal 182 is limited by the voltage at the arm of potentiometer 136 and the function generator 100.

The emitter follower portion 162 performs the usual functions of impedance matching to present a very high impedance to the function generator means so that current drain from the RC circuit of the function generator means 100 will be minimized. Compatible with this small current drain on the function generator means 100 the emitter follower portion 162 functions as an amplifier which drives the gated amplifier portion 185. The emitter follower circuit or the cascaded complementary directly coupled amplifier circuit is considered in the Handbook of Selected Semi-Conductor Circuits NAVSHIPS 93484 U.S. Government Printing Office, 1960, starting on page 3–13.

The gated amplifier portion 185 of the circuit is bilateral in nature, that is, it can deliver a peak current pulse to a storage means or device 208 or discharge a peak current from the storage means 208. By operating in this manner, the gated amplifier portion 185 enables the voltage of the storage means 208 to be changed rapidly in the positive or negative direction and eliminates the conventional dump circuit making it possible to generate a proportional waveform. The gated amplifier portion 185 charges or discharges the storage device 208 to the voltage applied to the terminal 182.

The gated amplifier portion 185 of the described embodiment comprises four transistors 190, 200, 210 and 220 which cooperate to charge a storage means or device 208 such as the one shown in FIGURE 7 and described later in the specification. To this end the transistors 190 and 200 are cooperatively coupled to the pulse generator means 160 via a resistor 189 (FIGURE 5) so that negative pulses are supplied to the emitter 191 of transistor 190 and to the base 201 of the transistor 200. The emitter 191 of the transistor 190 is connected to the negative bus 19 via the resistor 192 and 193 while its collector 195 is connected to the positive bus 30 via a resistor 196. The transistor 200 has its base 201 connected to the negative bus 19 via resistor 193 while its collector 202 is connected to the negative bus 19 via resistor 203. The emitter 206 of the transistor 200 is connected to the output terminal 230 via an emitter resistor 211. The output terminal 230 is in turn connected to the storage means 208 shown in FIGURE 7 which in the described embodiment comprises a coil 232 and a capacitor 234.

As a result of the above-described connections, the transistor 190 is biased so that the negative pulse from the pulse generator 60 enables the transistor 190 to transmit the voltage applied to the input terminal 182 to the base of the transistor 200. If the voltage applied to the base 201 of the transistor 200 is negative in relation to the voltage applied to the emitter 206 by the storage device 208, the storage device will discharge to the potential applied at the terminal 182. If the voltage applied to the base 201 is positive relative to the emitter 206 the transistor 200 will remain substantially nonconductive. It should be apparent that this portion of the gated amplifier means 160 enables the storage device 208 to go from one storage or charge condition to a lower charge condition.

The circuit branches that includes transistor 210 and 220 energize or enable the storage device to assume a higher charge or storage condition, that is, the transistors 210 and 220 will be dominant when the potential applied at the input terminal 182 is greater than the stored potential or charge of the storage device 208. The transistors 210 and 220 are enabled or triggered by a positive pulse from the pulse generator means 60 that is transmitted to the gated amplifier means 160 via a resistor 231 (FIGURE 5). The positive pulse is transmitted to the emitter 212 of the transistor 210 which in turn is connected to the positive bus 30 via resistors 213 and 215. The emitter 212 is also connected to the base 221 of the transistor 220 via the resistor 213. The collector 214 of the transistor 210 is connected to the negative bus 19 via a resistor 216. The base 218 is connected to the terminal 182. The transistor 220 has its emitter 222 connected to the output terminal 230 via the resistor 223 while its collector is connected to the positive terminal 30 via a resistor 224.

The above-described connections bias transistors 210 and 220 so that the positive pulse transmitted from the pulse generator means 60 enables the transistors 210 and 220 to conduct. The potential applied to terminal 182 is transmitted to the base 221. If this potential is more positive than the voltage stored in storage device 208 and applied to the emitter 222, then the transistor 220 will charge the storage device 208 to the potential applied to the terminal 182. It should be noted that a similar voltage as is applied to the base 221 is applied to the base 201 of the transistor 200. The supplying of such a voltage at the base 201 causes the transistor 200 to remain substantially nonconductive. It should also be noted that the voltage drop across the base to emitter circuit of the transistor 190 and the resistor 192 is equal to the voltage rise across the base to emitter transistor 200 and resistor 211. Similarly the voltage rise across the base to emitter circuit of transistor 210 and the resistor 213 equals the voltage drop across the base to emitter circuit of the transistor 220 and the resistor 223. This configuration enables the voltage applied to the terminal 182 to be transmitted to the output terminal 230 substantially unaffected in amplitude.

In summary the gated amplifier means 160 has three inputs: two pulse inputs from the pulse generator means 60 and one input from the function generator 100. The inputs from the pulse generator means trigger the gated amplifier means 160 to enable the output of the function generator means 100 to be sampled. The sampled or gated output from the function generator means 100 passes through an impedance matching or emitter follower means 162 that prevents the gated amplifier means 160 from substantially interfering with the operation of the function generator means 100. With the output of the function generator means 100 and the input from the pulse generator means 60 applied to the gated amplifier means 160 simultaneously the gated amplifier portion 185 will operate to charge or discharge the storage device 208 to the voltage or a voltage representative of the output of the function generator means 100.

As shown in FIGURE 7 the storage device 208 typically comprises a storage capacitor 234 and an inductance or choke 232. The storage device 208 operates to hold any signal transmitted from the gated amplifier means 160 and to supply an output which is transmitted to a low pass filter and eventually to the output of the demodulator system or assembly.

The gated amplifier means 160 may also be termed a sampling means for sampling the voltage output of the function generator means or along with the storage device 208 it may be termed a sample and hold circuit for sampling the voltage output of the function generator means 100 and for holding or storing the sampled signal. A discussion of such circuits appears in "Electronic Equipment Engineering" published November 1961, entitled Sample and Hold Circuit with Bilateral Charging, pages 43–47.

Typical components that may be utilized for the construction of the gated amplifier portion 185 and storage device 208 are:

| Elements: | | Values of the elements |
|---|---|---|
| Transistor **190** | | 2N706 |
| Resistor **192** | ohms | 150 |
| Resistor **193** | do | 5.1K |
| Resistor **196** | do | 470 |
| Transistor **200** | | 2N863 |
| Resistor **203** | ohms | 220 |
| Transistor **210** | | 2N863 |
| Resistor **211** | ohms | 22 |
| Inductor **232** | microhenries | 2.2 |
| Capacitor **234** | picofarads | 330 |
| Resistor **213** | ohms | 150 |
| Resistor **215** | do | 5.1K |
| Resistor **216** | do | 470 |
| Transistor **220** | | 2N706 |
| Resistor **223** | ohms | 22 |
| Resistor **224** | do | 220 |

The final functional subassembly of the demodulator system is shown in FIGURE 8 and is a low pass filter which serves to properly form the output of the storage device 208 into a voltage which approaches an exact replica of the input signal that originally modulated the carrier signal. This low-pass filter is a typical active filter such as is described in the article, "Transistor Active Filter Design," by Daniel Meyer published April 1960 in "Electrical Design News" starting on page 54. This article adequately describes the design of a low pass filter circuit so that one of the ordinary skill in the art could readily construct such a circuit as shown in FIGURE 8.

The embodiment shown employs an emitter follower 244 or cascaded complementary directly coupled amplifier such as the one described in conjunction with FIGURE 6. It functions in a similar manner to provide an impedance matching device, a means for reducing any current drain from the capacitor 234 and a means for amplifying the output derived from the storage device 208. The emitter follower includes transistors 240 and 242 and resistors 246 and 248 connected as shown.

The output terminal 250 of the emitter follower 244 is connected to the filter portion 252 of the circuit. The filter portion 252 comprises cut-off frequency control resistors 254 and 256. The resistor 256 is connected to a filter capacitor 258 and to the base 259 of a transistor 260. The transistor 260 has its collector 262 coupled to the base 264 of a transistor 266. The collector 268 of the transistor 266 is connected to a resistor 270 and to the emitter 272 of the transistor 260. The resistor 270 is in turn connected to the resistor 256 via a coupling capacitor 274 and is connected to the negative bus 19 via resistor 271. The resistor 270 and the coupling capacitor 274 form a feedback circuit branch. The cascaded transistors 260 and 266 provide an improved alpha characteristic for the filter arrangement and improve the linearity of the filter while maintaining a low output impedance. The filter circuit 238 is effective for all selected tape speeds when used in a recorder system. When used in other types of systems, it is effective for all selected carrier frequencies. The output from this filter circuit is shown in FIGURE 2, graph F. This circuit is described in greater detail in the referred to article.

The above-described low-pass filter circuit 238 may be constructed from the following circuit elements:

| Elements: | | Values of the elements |
|---|---|---|
| Transistor **240** | | 2N1307 |
| Transistor **242** | | 2N1306 |
| Resistor **246** | ohms | 4.3K |
| Resistor **248** | do | 3K |
| Resistor **254** | do | 200–20K |
| Resistor **256** | do | 200–20K |
| Capacitor **258** | microfarads | 0.0039 |
| Transistor **260** | | 2N706 |
| Transistor **266** | | 2N1305 |
| Resistor **270** | ohms | 250 |
| Resistor **271** | do | 1K |
| Resistor **273** | do | 2.2K |
| Capacitor **274** | microfarads | .039 |

In summary the demodulator circuit assembly comprises a trigger signal generator means 11 for generating trigger pulses at a rate proportional to the input frequency of the input signal which are transmitted to a pulse generator means 60 (FIGURE 2, graph B and FIGURE 3). The pulse generator means 60 generates well defined pulses which may be positive or negative or as in the described embodiment, positive and negative. These pulses from the pulse generator means 60 are also proportional to the frequency of the input signal and are transmitted to the function generator means 100 and the gated amplifier means 160 (FIGURE 2, graph C and FIGURE 4). The pulses which are transmitted to the gated amplifier means 160 function to gate the gated amplifier means 160 which in turn samples the output of the function generator means 100 and transfers representative information to the storage means 208 (FIGURE 2, graph E). The gated amplifier means 160 (FIGURE 6) in the described embodiment is a bilateral means and specifically functions to charge or discharge the storage means 208 which includes a storage capacitor (FIGURE 7). Since the gated amplifier means 160 can both charge and discharge the storage means 208 to the voltage input applied by the function generator means 100 both positive and negative pulses from the pulse generator means 60 are utilized.

The input to the gated amplifier means 160 from the function generator means 100 takes the form of a hyperbolic or exponetial waveform (FIGURE 2, graph D and FIGURE 5). The function generator means 100 generates this exponetial waveform by the use of an RC circuit in combination with charging and discharging circuits that include solid state elements or transistors. The voltage applied by the function generator means 100 to the gated amplifier means 160 is proportional or related to the frequency or information of the input signal. The pulse transmitted from the pulse generator means 60 to the function generator means 100 serves to reset or discharge the function generator means 100 after which the RC circuit again begins to charge. It can be seen that the gated amplifier means 160 will sense or sample the output for the function generator means 100 and a short time thereafter the function generator means will be reset by the negative going portion of the positive pulse transmitted by the pulse generator means 60.

The gated amplifier means 160 supplies its output to the storage means 208 which in turn stores the transmitted signal and supplies an output voltage to the low-pass filter 238 that is proportional to the frequency of the input signal. At each sampling the storage means 208 will only charge if the output applied by the gated amplifier means is different from the previous input. The output signal from the storage device 208 takes the form of a step-like voltage with the rise or height of each step proportional to the voltage difference between succeeding samples transmitted by the gated amplifier means 160 (FIGURE 2, graph E). The storage means 208 is connected to a low-pass filter 238 which accepts the step like voltage wave from the storage means 208 and forms the wave into a smooth output signal (FIGURE 2, graph F and FIGURE 8). This output from a low pass filter is the desired output from the demodulator system. It is a voltage having an amplitude that is representative of the frequency of the input signal.

From the above summary and detailed description it can be seen that a demodulator system has been provided wherein a minimum of filtering is required. The filtering necessary is compatible with a multitude of carrier frequencies such that when the system is used in an F-M recorder system it is unnecessary to insert additional capacitors in a low-pass filter in order to provide a representative voltage output signal. In addition to this significant advantage, the demodulator system or assembly is accurate, reliable, substantially linear in operation and in many respects, simpler than prior systems.

While the above detailed description has shown, described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A demodulator circuit for converting a frequency modulated input signal to a representative voltage the combination comprising:

pulse generator means for generating a series of simultaneous positive and negative pulses in proportion to the frequency of said input signal;

function generator means connected to said pulse generator means for generating an approximate hyperbolic output signal in response to the positive pulses of the pulse generator means;

said approximate hyperbolic output signal instigated periodically by the pulses from said pulse generator means;

gated amplifier means connected to said function generator means and to said pulse generator means for sampling said approximate hyperbolic output signal of said function generator means in response to the positive and negative pulses from said pulse generator means;

temporary storage means connected to said gated amplifier means to receive the output signal sampled thereby and to hold the sampled signal at an amplitude and for a period commensurate with the frequency of said generated series of pulses; and filter means connected to said temporary storage means to receive the signals held therein and to form thereof a smoothly contoured output defining said representative voltage.

2. The demodulator circuit of claim 1 wherein said function generator means comprises:

an RC circuit means for generating an approximate hyperbolic output signal;

a charging circuit means operatively coupled to the pulse generator means and to said RC circuit means for charging said RC circuit means; and a discharging circuit means operatively coupled to the pulse generator means and to said RC circuit means for rapidly discharging said RC circuit means and to place the function generator means into condition for a succeeding charge-discharge cycle.

3. The demodulator circuit of claim 1 wherein said pulse generator means comprises, trigger means for generating sharp pulses proportional to the frequency of said frequency modulated input signal, and a pulse generator connected to said trigger means to receive the sharp pulses and to generate an output signal of pulses having selected constant amplitudes.

4. The demodulator circuit of claim 3 wherein said pulse generator comprises a one-shot multivibrator having a feedback circuit adapted to turn the multivibrator circuit off.

5. The demodulator circuit of claim 2 wherein said charging circuit is responsive to the positive pulses introduced thereto by said pulse generator means, and said discharging circuit is responsive to the negative-going portion of the same positive pulses.

6. The demodulator circuit of claim 5 wherein the charging circuit and discharging circuit means include a normally-on and a normally-off transistor respectively during the charging process, wherein the negative going portion of the positive pulses reverse the transistor states during the discharging process.

7. The demodulator circuit of claim 6 wherein said RC circuit means comprises a resistor, a plurality of capacitors, and switch means for selecting a capacitor from said plurality to provide an RC circuit which is compatible with the carrier frequency of said frequency modulated input signal.

8. The demodulator circuit of claim 1 wherein the gated amplifier means further comprises an impedance matching circuit connected to said function generator means and adapted to isolate the function generator means from the gated amplifier means, and a bilateral gated amplifier circuit coupled to said impedance matching circuit and to said pulse generator means and responsive to the positive and negative pulses introduced thereto, to selectively charge and discharge said temporary storage means to the voltage level representative of the output from the function generator means.

References Cited

UNITED STATES PATENTS

| | | | |
|---|---|---|---|
| 3,158,845 | 11/1964 | Bengston | 340—174 |
| 3,173,025 | 3/1965 | Davidson | 307—88.5 |

ARTHUR GAUSS, *Primary Examiner.*

J. ZAZWORSKY, *Assistant Examiner.*